(12) United States Patent
Ade et al.

(10) Patent No.: US 11,223,307 B2
(45) Date of Patent: Jan. 11, 2022

(54) COMBINATION OF AN ELECTRIC ROTARY MACHINE WITH A CONVERTER UNIT AND WIND TURBINE

(71) Applicant: FLENDER GmbH, Bocholt (DE)

(72) Inventors: Michael Ade, Berlin (DE); Andreas Jöckel, Nuremberg (DE); Norbert Schönbauer, Bad Füssing (DE)

(73) Assignee: FLENDER GMBH, Bocholt (DE)

( * ) Notice: Subject to any disclaimer, the term of this patent is extended or adjusted under 35 U.S.C. 154(b) by 0 days.

(21) Appl. No.: 17/041,961

(22) PCT Filed: Feb. 11, 2019

(86) PCT No.: PCT/EP2019/053219
§ 371 (c)(1),
(2) Date: Sep. 25, 2020

(87) PCT Pub. No.: WO2019/185224
PCT Pub. Date: Oct. 3, 2019

(65) Prior Publication Data
US 2021/0111650 A1    Apr. 15, 2021

(30) Foreign Application Priority Data
Mar. 27, 2018  (EP) ..................... 18164331

(51) Int. Cl.
*H02P 9/10*      (2006.01)
*F03D 9/25*     (2016.01)
*H02P 101/15*   (2016.01)

(52) U.S. Cl.
CPC ............... *H02P 9/102* (2013.01); *F03D 9/25* (2016.05); *F05B 2220/706* (2013.01);
(Continued)

(58) Field of Classification Search
CPC .. Y02E 10/72; H02K 2213/12; H02K 7/1838; H02K 3/28; F03D 9/25
(Continued)

(56) References Cited

U.S. PATENT DOCUMENTS

| | | | | |
|---|---|---|---|---|
| 4,906,060 A | * | 3/1990 | Claude | ................. F03D 7/0272 322/29 |
| 8,803,354 B2 | * | 8/2014 | Wamble, III | ........... H02P 9/008 290/55 |

(Continued)

FOREIGN PATENT DOCUMENTS

| | | |
|---|---|---|
| EP | 1 416 604 A2 | 5/2004 |
| EP | 2 685 602 A1 | 1/2014 |

OTHER PUBLICATIONS

PCT International Search Report and Written Opinion of International Searching Authority dated May 27, 2019 corresponding to PCT International Application No. PCT/EP2019/053219 filed Nov. 2, 2019.

*Primary Examiner* — Charles Reid, Jr.
(74) *Attorney, Agent, or Firm* — Henry M. Feiereisen LLC (57) ABSTRACT

A rotary machine includes a rotor rotatable about a rotation axis and a stator mechanically divided into stator segments, each covering a respective section in relation to the rotation axis. Coils of one individual multi-phase rotary system are respectively arranged in the stator segments, each having terminals which connect phase lines of an individual multi-phase rotary system and are connected to the coils. A converter unit includes multiple subunits operated independently of one another, each forming an individual multi-phase rotary system. The number of phases of the subunits corresponds to the number of stator segments. The terminals of the stator segments are each connected to a subunit. The stator segments form groups of directly successive stator
(Continued)

segments when viewed about the rotation axis. The terminals of the stator segments are connected to the same sub-unit within each group, but connected to different sub-units from group to group of stator segments.

14 Claims, 5 Drawing Sheets

(52) U.S. Cl.
CPC ....... *F05B 2240/21* (2013.01); *F05B 2240/85* (2020.08); *H02P 2101/15* (2015.01)

(58) Field of Classification Search
USPC .................................................... 290/44, 55
See application file for complete search history.

(56) References Cited

U.S. PATENT DOCUMENTS

| | | | |
|---|---|---|---|
| 8,823,241 B2* | 9/2014 | Jore | H02K 3/26 |
| | | | 310/268 |
| 9,154,024 B2* | 10/2015 | Jore | H02K 16/04 |
| 10,177,620 B2* | 1/2019 | Smith | H02K 11/27 |
| 2004/0100102 A1 | 5/2004 | Wobben | |
| 2011/0316287 A1* | 12/2011 | Stiesdal | H02K 3/28 |
| | | | 290/55 |
| 2012/0133142 A1 | 5/2012 | Langel | |
| 2012/0217746 A1* | 8/2012 | Groendahl | F03D 9/255 |
| | | | 290/44 |

* cited by examiner

COMBINATION OF AN ELECTRIC ROTARY MACHINE WITH A CONVERTER UNIT AND WIND TURBINE

CROSS-REFERENCES TO RELATED APPLICATIONS

This application is the U.S. National Stage of International Application No. PCT/EP2019/053219, filed Feb. 11, 2019, which designated the United States and has been published as International Publication No, WO 2019/185224 and which claims the priority of European Patent Application, Serial No. 18164331.3 filed Mar. 27, 2018, pursuant to 35 U.S.C. 119(a)-(d).

BACKGROUND OF THE INVENTION

The present invention is based on a combination of an electric rotary machine with a converter unit,
  wherein the rotary machine has a stator and a rotor,
  wherein the rotor can be rotated about an axis of rotation,
  wherein the stator is mechanically divided into a number of stator segments, which each cover a respective sector in relation to the axis of rotation,
  wherein the coils of only an individual multi-phase rotary system are arranged in the stator segments in each case,
  wherein the stator segments in each case also only have the terminals for connecting the phase wires of an individual multi-phase rotary system and
  wherein the terminals are connected to the coils of the phases,
  wherein the converter unit has a plurality of subunits,
  wherein the subunits can be operated independently of one another and each form an individual multi-phase rotary system,
  wherein the number of phases of the subunits matches the number of phases of the stator segments,
  wherein the terminals of the stator segments of the rotary machine are each connected to one of the subunits of the converter unit,
  wherein the stator segments form groups of immediately successive stator segments, when viewed about the axis of rotation,
  wherein the terminals of the stator segments within the respective group are connected to the same subunit of the converter unit,
  wherein the terminals of the stator segments of successive groups of stator segments, when viewed about the axis of rotation, are connected to subunits of the converter unit which differ from one another,
  that the groups of stator segments are each made of a plurality of stator segments,
  that the groups of stator segments extend over 360°/n in each case, wherein n is equal to the number of subunits connected to the coils of the rotary machine,
The present invention is furthermore based on a wind power installation,
  wherein the wind power installation has a wind turbine and a combination of this kind,
  wherein the wind turbine drives the rotor of the electric rotary machine of the combination.

Electric rotary machines are usually operated via converter units. This applies equally to electric motors and electric generators.

In smaller electric rotary machines, the stator is made of a circular, closed unit. In larger electric rotary machines, this often proves unfeasible. In this case, the stator is mechanically divided into a number of identical stator segments, which each cover a respective sector in relation to the axis of rotation.

Usually, the coils of only an individual multi-phase rotary system are arranged in the stator segments in each case. Accordingly, the stator segments in each case also only have the terminals for connecting the phase wires of an individual multi-phase rotary system. The terminals are connected to the coils of the phases.

In very large electric rotary machines—generally of the performance category of 1 MW and more—the converter units are often divided into a plurality of subunits, in most cases two subunits, but sometimes even more subunits. In this case, the subunits can be operated independently of one another and each form an individual multi-phase rotary system. Arranged in the stator segments in this case are the coils of a plurality of multi-phase rotary systems, generally one winding system for each subunit in each case. In this case, the stator segments also have the terminals for connecting the phase wires of a plurality of multi-phase rotary systems, namely the terminals necessary for each winding system in each case. The number of phases of the subunits matches the number of phases of the winding systems of the stator segments. The terminals of the stator segments of the rotary machine are connected to the subunits. In this context, each stator segment is connected to a plurality of—at least two—subunits.

In order to produce the necessary connections of the subunits of the converter unit to the terminals of the stator segments, in the prior art ring wires are provided which run around the axis of rotation. The ring wires are expensive. Furthermore, they cause the rotary machine to be extended axially. Furthermore, this results in a high outlay for the creation and insulation of the ring wires and other current-conducting or voltage-carrying elements from one another.

The provision of a plurality of subunits in the converter unit and, corresponding with this, the provision of the coils of a plurality of multi-phase rotary system in the stator segments, has the purpose of being able to maintain an emergency operation of the combination comprised of the electric rotary machine and the associated converter unit in the event of a failure of one of the subunits. Due to the formation of the rotating field of the rotary machine, which in this case is no longer uniform, however, high eddy current losses occur in the rotor of the rotary machine.

A combination of an electric rotary machine with a converter unit of the kind mentioned in the introduction are known from US 2012/0133142 A1, for example.

The object of the present invention resides in reducing eddy current losses occurring in the rotor, in particular in the event of a failure of one of the subunits. Where possible, the outlay for the ring wires should additionally also be reduced.

SUMMARY OF THE INVENTION

The object is achieved by a combination of an electric rotary machine with a converter unit as set forth hereinafter. Advantageous embodiments of the combination are the subject matter of dependent claims.

According to the invention, a combination of the type mentioned in the introduction is embodied in such a way
  that the converter unit has a switching device arranged between the subunits and the coils of the rotary machine, via which it is possible to adjust which of the subunits of the converter unit is connected to the coils of which groups of stator segments, that in the event of a failure of one of the subunits, a resultant force acts on the rotor in the radial direction and that in the event of a failure of one of the subunits, the subunits are connected to the groups of stator segments in such a way that the direction of the resultant force, as far as possible, is directed counter to the weight force which the rotor exerts on its bearing.

Due to this embodiment, on the one hand, the eddy current losses occurring in the event of a failure of one of the subunits in the rotor can be considerably reduced. The larger the groups of stator segments formed, the greater the reduction.

At a minimum, the terminals of the respective stator segment are in each case only connected to a single group of immediately successive coils, when viewed about the axis of rotation, which group is arranged on the respective stator segment. Preferably, however, the terminals of the respective stator segment are in each case connected to a plurality of groups of immediately successive coils, when viewed about the axis of rotation, which groups are arranged on the respective stator segment. In this case, arranged between every two groups of immediately successive coils, when viewed about the axis of rotation, of one of the phases is one group of immediately successive coils, when viewed about the axis of rotation, of each of the other phases.

The number of coils per coil group may be determined as required. It may amount to one, but may also be greater than one.

It is possible to connect the stator segments individually to the subunits of the converter unit via corresponding connecting cables. In a preferred embodiment, however, the stator has partial ring wires, which extend over a partial circumference, when viewed about the axis of rotation, and which are each connected to the terminals of the stator segments of an individual group of stator segments. The respective partial ring wire therefore extends substantially over the same angular range as the respective group of stator segments. The coils of the segments form the windings arranged on the respective segment. In order to connect the windings of the stator segments of the respective group to one of the subunits of the converter unit, however, just a single connecting cable is necessary. It is therefore possible to considerably reduce the number of connecting cables and the assembly outlay associated therewith. Furthermore, as the partial ring wires only extend over a partial circumference, it is possible to both keep the axial extension of the rotary machine low and reduce the outlay for the ring wires.

Preferably, the partial ring wires for each phase each have a further terminal for connecting the respective partial ring wire to one of the subunits of the converter unit. A connection outside the confined circumstances of the stator segments is possible as a result.

In a possible embodiment of the present invention, the angular range is chosen to be as large as possible. In this case, the number of groups of stator segments is therefore equal to the number of subunits of the converter unit connected to the windings of the rotary machine. This embodiment has the advantage that the eddy current losses which occur in the event of a failure of one of the subunits in the rotor are as low as possible.

The rotary machine may be embodied as a conventional internal rotor machine. Preferably, however, the rotor is embodied as an external rotor.

Depending on the design of the dynamoelectric machine (rotary machine) as an internal rotor or as an external rotor, the subunits are arranged about the stator and/or in an axial extension of the stator and/or in the stator. This positioning depends upon the local conditions and the design of the dynamoelectric machine (rotary machine), in particular of the generator.

The number of phases of the rotary systems preferably amounts to three—as is generally common.

The object is furthermore achieved in accordance with the invention by a wind power installation wherein the wind power installation has a wind turbine and a combination as set forth above and wherein the wind turbine drives the rotor of the electric rotary machine of the combination.

BRIEF DESCRIPTION OF THE DRAWING

The properties, features and advantages of this invention described above as well as the manner in which they are achieved will become clearer and more comprehensible in conjunction with the following description of the exemplary embodiments, which are explained in more detail in conjunction with the drawings, in which, shown in a schematic representation.

DETAILED DESCRIPTION OF PREFERRED EMBODIMENTS

Figure 1:
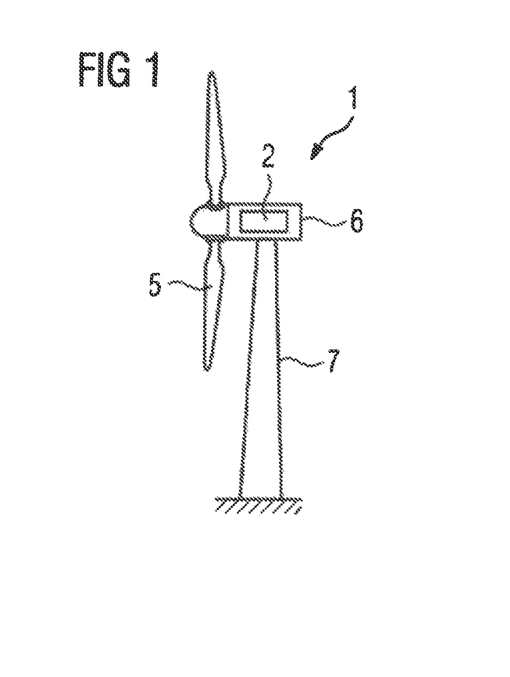
FIG. 1 shows a wind power installation.
Figure 2:
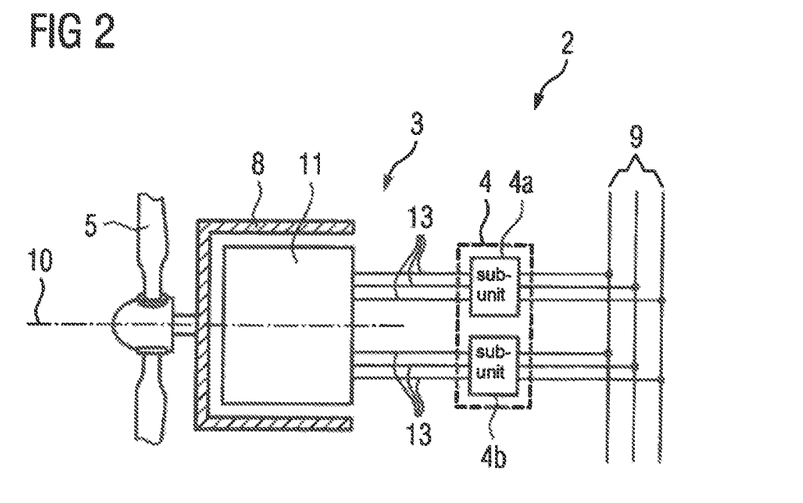
FIG. 2 shows a part of the wind power installation.

According to FIGS. 1 and 2, a wind power installation has a turbine-generator combination 1. On one side, the turbine-generator combination 1 has a combination 2 of an electric rotary machine 3 and a converter unit 4, and on the other side, a wind turbine 5. As a rule, the combination 2 is arranged in a nacelle 6, which for its part is arranged at the upper end of a tower 7 of the wind power installation. The wind turbine 5 is arranged outside the nacelle 6. The wind turbine 5 drives a rotor 8 of the electric rotary machine 3.

The wind turbine 5 is able to act on the rotor 8 directly and immediately. In this case, a rotational speed of the rotor 8 matches a rotational speed of the wind turbine 5. Alternatively, the wind turbine 5 may act on the rotor 8 via a gear unit. In this case, the rotational speed of the rotor 8 and the rotational speed of the wind turbine 5 correspond to a transmission ratio of the gear unit. Via the converter unit 4, the wind power installation feeds electrical current into a supply network 9.

The rotor 8 is embodied as an external rotor, according to the representation in FIG. 2. However, it could also be embodied as an internal rotor. Regardless of the embodiment as an external rotor or as an internal rotor, the rotor 8 can be rotated about an axis of rotation 10.

Insofar as reference is made hereinbelow to "axial", "radial" and "tangential", these always relate to the axis of rotation 10. "Axial" is a direction parallel to the axis of rotation 10. "Radial" is a direction orthogonal to the axis of rotation 10 directly toward the axis of rotation 10 or away from it. "Tangential" is a direction which is directed both orthogonally to the axial direction and orthogonally to the radial direction. "Tangential" is therefore a direction which is directed around the axis of rotation 10 in a circular manner, with a constant axial position and at a constant radial distance.

The rotary machine 3 has a stator 11 in addition to the rotor 8. The mechanical structure of the stator 11 and the electrical interconnection of coils 12 arranged in the stator 11 (see FIG. 5) to the converter unit 4 are the core subject matter of the present invention.

Figure 3:
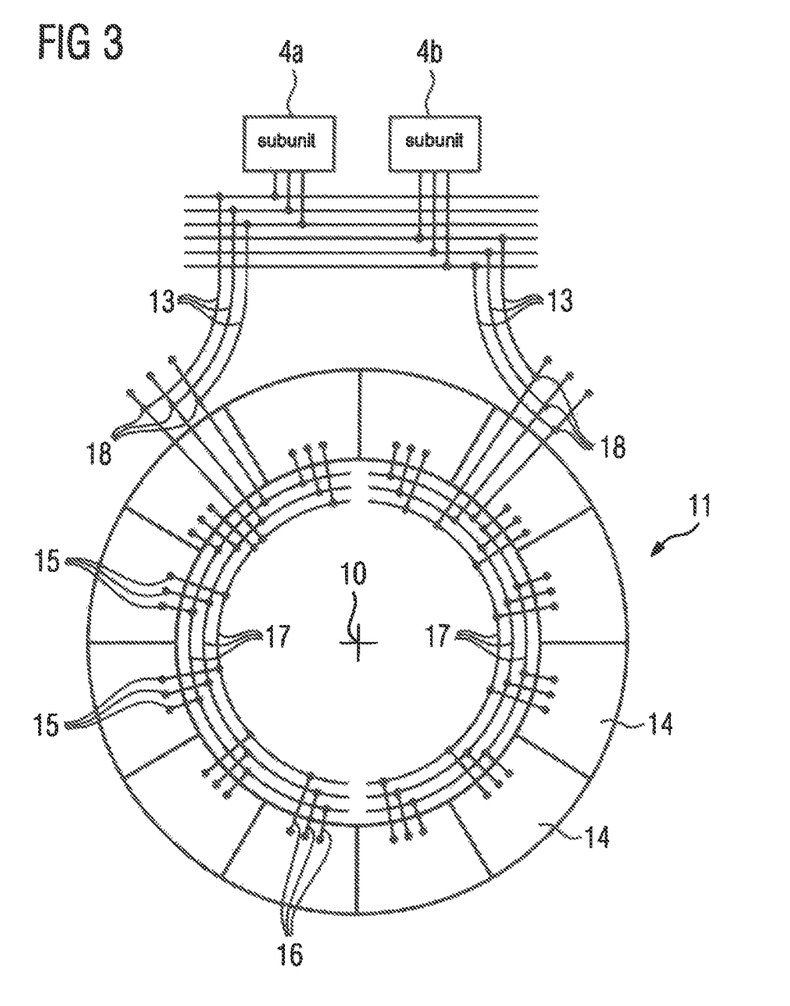
FIG. 3 shows a stator and a converter unit.
Figure 4:
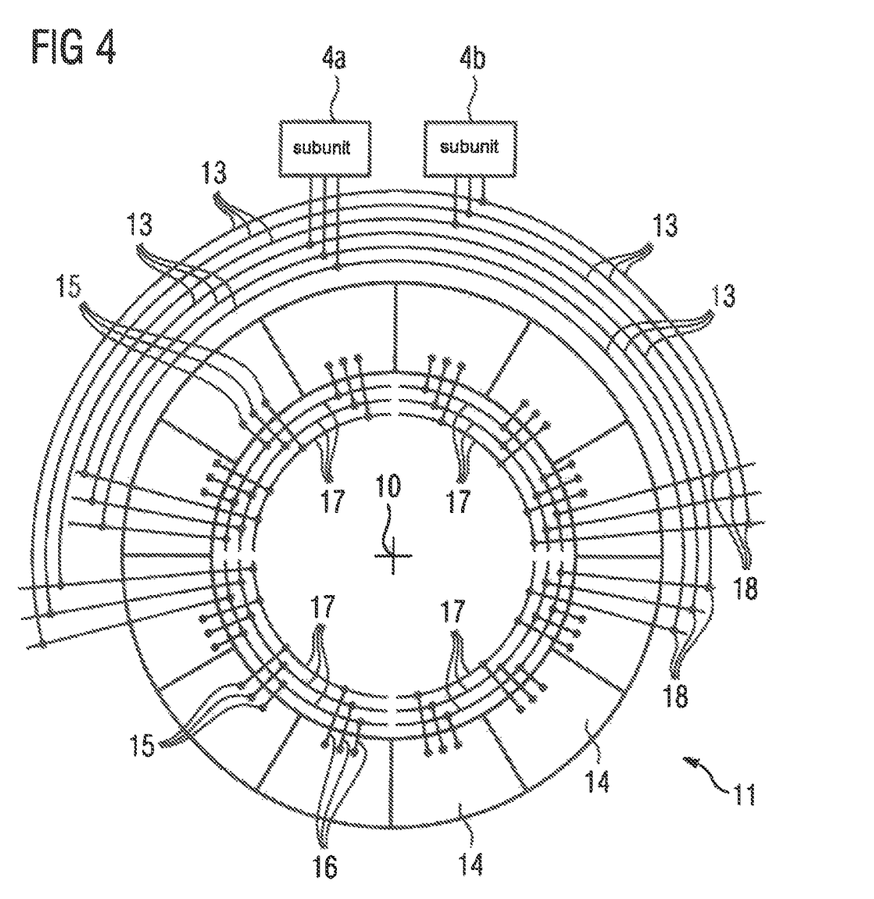
FIG. 4 shows a stator and a converter unit.

As can already be seen in FIG. 2 and is shown in further detail in FIGS. 3 and 4, the converter unit 4 has a plurality of subunits 4a, 4b. In FIGS. 2, 3 and 4, the minimum number (two subunits 4a, 4b) is shown. The invention which follows is also explained in conjunction with the minimum number of subunits 4a, 4b. In principle, however, more than two subunits 4a, 4b could also be present.

The subunits 4a, 4b can be operated independently of one another. In particular, each subunit 4a, 4b can be operated both together with the other subunit 4b, 4a (or, in the case of more than two subunits 4a, 4b, together with the other subunits 4a, 4b) and also without the other subunit 4b (or, in the case of more than two subunits 4a, 4b, without the other subunits 4a, 4b or only together with some of the other subunits 4a, 4b). During normal operation of the converter unit 4, the subunits 4a, 4b are operated together. In the event of a failure of one of the subunits 4a, 4b, however, the subunits 4b, 4a which have not failed can continue to be operated.

The subunits 4a, 4b, as relates to their connection to the stator 11 of the rotary machine 3, each form an individual multi-phase rotary system. The number of phases amounts to at least three. Generally speaking, it is also the case that no more than three phases are present. This case is shown in FIGS. 2, 3 and 4, because in each case three connecting wires 13 are drawn between the subunits 4a, 4b and the stator 11.

According to the representation in FIGS. 3 and 4, the stator 11 is mechanically divided into a number of stator segments 14. The stator segments 14 are—at least generally—of the same construction. In FIGS. 3 and 4, only a few of the stator segments 14 are provided with their reference characters, in order to not overload FIGS. 3 and 4. The stator segments 14 each cover a respective sector in relation to the axis of rotation 10. According to FIGS. 3 and 4, twelve stator segments 14 are present in each case, so that each stator segment 14 covers a sector of 30°. The number of stator segments 14 could also, however, be higher or lower.

Figure 5:
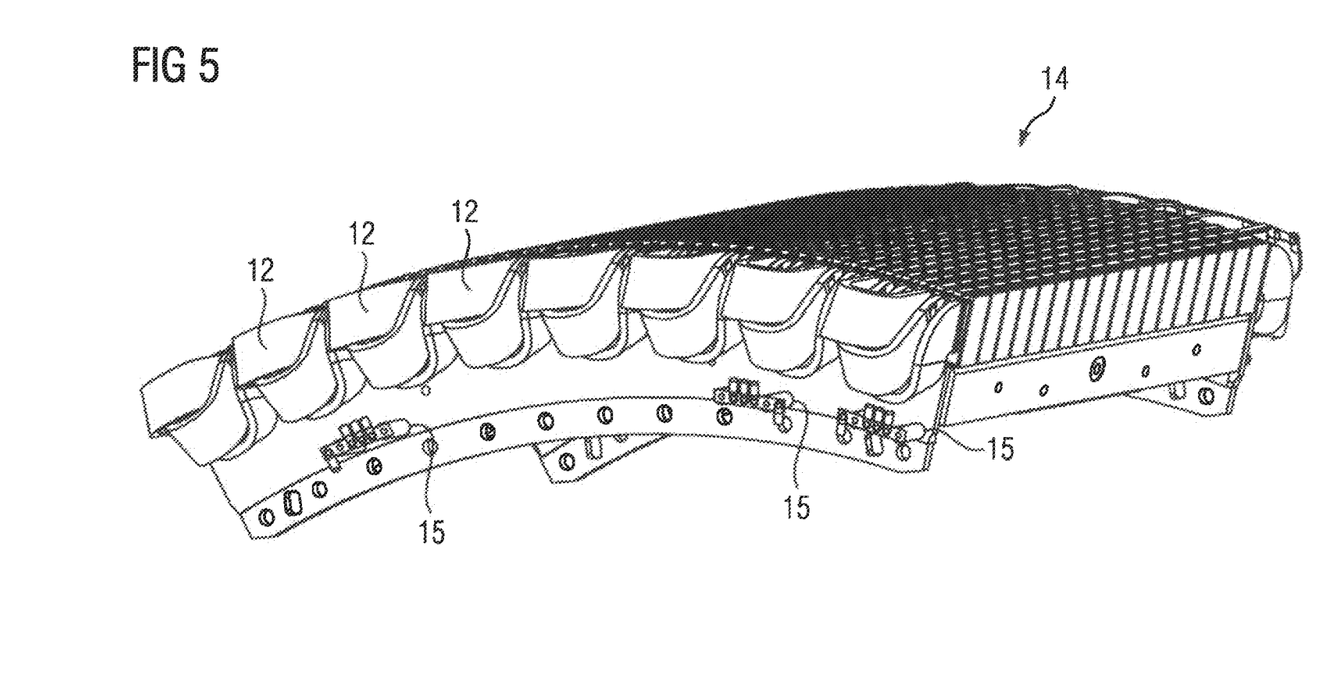
FIG. 5 shows a perspective representation of a stator segment.

In FIG. 5, one of the stator segments 14 is shown—representative for all stator segments 14. According to the representation in FIG. 5, the coils 12 of a multi-phase rotary system are arranged on each of the stator segments 14. In this context, the coils 12 belong to a single multi-phase rotary system. Regardless of the number of coils 12 arranged on the respective stator segment 14, the number of coils 12 arranged on the respective stator segment 14 is an integer multiple of the number of phases. Therefore—in the case of three phases—a minimum of six coils 12 are arranged on the respective stator segment 14. The coils 12 belonging to the same phase are connected in parallel with one another. In the case of the—purely exemplary—representation in FIG. 5, a total of nine coils 12 are arranged on the stator segment 14 shown in this figure for each phase. Because of the circumstance that, in the present case, the rotary system is embodied with three phases, a total of 27 coils 12 are therefore present.

According to the representation in FIGS. 3, 4 and 5, the stator segment 14 has terminals 15 for connecting the phase wires 16 of an individual multi-phase rotary system. In FIGS. 3 and 4, only a few of the terminals 15 and the phase wires 16 are provided with their reference characters, in order to not overload FIGS. 3 and 4. In FIG. 5, three outgoing branches are indicated pointing up and one outgoing branch is indicated pointing down in the terminals 15 in each case. The coils 12 are connected to the outgoing branches pointing up; the respective phase wire 16 is connected to the outgoing branch pointing down. The terminals 15 may be embodied as screw terminals. This is not mandatory however. The phase wires 16 in particular may be the connecting wires 13. They may also, however, be wires which differ from the connecting wires 13. This becomes clearer from later embodiments.

The number of terminals 15 on the respective stator segment 14 corresponds to the number of phases of the rotary system of the subunits 4a, 4b. The terminals 15 are connected to the windings of the phases connected in parallel with one another. In particular, the number of phases of the subunits 4a, 4b therefore matches the number of phases of the stator segments 14. Regardless of whether the phase wires 16 are the connecting wires 13 or other wires, the terminals 15 of the stator segments 14 of the rotary machine 3 are each connected to one of the subunits 4a, 4b. The terminals 15, on the other hand, are not connected to a plurality of the subunits. 4a, 4b. Although it is possible for the terminals 15 to be able to be connected to a plurality of the subunits 4a, 4b, in this case the connecting of the terminals to the subunits 4a, 4b is mutually interlocked. If, therefore, at a given point in time, certain terminals 15 are connected to the subunit 4a, then the same terminals 15 cannot be connected to the subunit 4b (or generally a subunit 4b other than the subunit 4a) at this point in time.

The stator segment 14 does not have further terminals connected to windings of the stator 11. The stator segment 14 therefore only has the terminals 15 for an individual rotary system.

It is possible to arrange the total of 27 coils 12 of the stator segment 14 shown in FIG. 5 on the stator segment 14 in the sequence a- . . . -a-b- . . . -b-c- . . . -c. In this case, the terminals 15 of the respective stator segment 14 are each connected to a group of coils 12 arranged on the respective stator segment 14, wherein the coils 12 of the respective group are immediately successive in the tangential direction. The number of coils 12 per group of coils 12 would be nine in this case. A similar embodiment (a-a-b-b-c-c) is also conceivable with other numbers, e.g. a total of only six coils 12.

Alternatively, is possible to arrange the total of 27 coils 12 of the stator segment 14 shown in FIG. 5 on the stator segment 14 in the sequence a-b-c-a-b-c- . . . -a-b-c. In this case, the terminals 15 of the respective stator segment 14 are each connected to a plurality of groups of coils 12 arranged on the respective stator segment 14, wherein the coils 12 of the respective group are immediately successive in the tangential direction. The number of coils 12 per group of coils 12 amounts to one in this case (degenerated case).

The coils 12 may also be arranged on the stator segment 14 in the sequence a-a-a-b-b-b-c-c-c-a-a-a- . . . -c-c-c, for example. In this case, the terminals 15 of the respective stator segment 14 would each likewise be connected to a plurality of groups of coils 12 arranged on the respective stator segment 14, wherein the coils 12 of the respective group are immediately successive in the tangential direction. The number of coils 12 per group of coils 12, however, would be greater than one in this case (non-degenerated case). Similar embodiments are also possible if another suitable number of coils 12 were to be arranged on the stator segment 14, for example 18 coils 12 or 24 coils 12.

In both cases—i.e. both in the degenerated case and in the non-degenerated case—arranged between every two groups of tangentially immediately successive coils 12 of one of the phases is a group of tangentially immediately successive coils 12 for each of the other phases.

According to the representation in FIGS. 3 and 4, the stator segments 14 form groups of tangentially immediately successive stator segments 14. Within the respective group of stator segments 14, the terminals 15 of the stator segments 14 are connected to the same subunit 4a, 4b of the converter unit 4. The terminals 15 of the stator segments 14 of tangentially successive groups of stator segments 14, on the other hand, are connected to subunits 4a, 4b of the converter unit 4 which differ from one another.

Similarly to the grouping of the coils 12 on the stator segments 14, the groups of stator segments 14 may be made of an individual stator segment 14 in each case. According to the representation in FIGS. 3 and 4, however, the groups of stator segments 14 are made of a plurality of stator segments 14 in each case.

In particular, the groups of stator segments 14 extend over 360°/n as a rule in each case. n is an integer multiple of the number of subunits 4a, 4b. In the embodiment according to FIG. 3, the groups of stator segments 14 extend over 180°, in the embodiment according to FIG. 4 over 90°. In the embodiment according to FIG. 3, the number of groups of stator segments 14 is therefore equal to the number of subunits 4a, 4b of the converter unit 4 connected to the coils 12 of the rotary machine 3. In the embodiment according to FIG. 4, which as such does not form the subject matter of the present invention, the number of groups of stator segments 14 is equal to twice the number of subunits 4a, 4b of the converter unit 4 connected to the coils 12 of the rotary machine 3.

It is possible, starting from the subunits 4a, 4b, to lay respective connecting wires 13 directly to the terminals 15 of the stator segments 14. Preferably, however, according to the representation in FIGS. 3 and 4, the stator 11 has partial ring wires 17. The partial ring wires 17 each extend tangentially over a partial circumference. The partial circumference runs in the same angular range as the respective group of stator segments 14. The extension of the partial ring wires 17 may be (slightly) larger than the angular range over which the groups of stator segments 14 extend in each case. Alternatively, it may just as large and, primarily, it may be (generally slightly) smaller than this angular range. In this case, however, the partial ring wires 17, where these are present, have to extend sufficiently far in the tangential direction that the phase wires 16 to the terminals 15 of the stator segments 14 of one (1) group of stator segments 14 can be connected to the partial ring wires 17.

It is possible for the terminals 15 of the stator segments 14 to be embodied in such a manner that, via the phase wires 16, both the partial ring wires 17 and additionally the connecting wires 13 can be connected to the terminals 15. In this case, in addition to the phase wires 16, the connecting wires 13 are also connected to the terminals 15 of one (1) stator segment 14. In this case, this one (1) stator segment 14 of the respective group of stator segments 14 is connected directly to the corresponding subunit 4a, 4b of the converter unit 4 via the connecting wires 13. The other stator segments 14 of the respective group of stator segments 14 are, in this case, connected indirectly to the corresponding subunit 4a, 4b of the converter unit 4 via the phase wires 16 of this one stator segment to the associated partial ring wires 17 and via the phase wires 16 of the other stator segments 14 of the respective group.

According to the representation in FIGS. 3 and 4, however, the partial ring wires 17 for each phase each have a further terminal 18. In this case, the connecting wires 13 are connected to the further terminals 18. In FIGS. 3 and 4, only a few of the further terminals 18 are provided with their reference characters, in order to not overload FIGS. 3 and 4. If the further terminals 18 are present, then all stator segments 14 of the respective group of stator segments 14 are connected to the corresponding subunit 4a, 4b of the converter unit 4 via their phase wires 16 and the partial ring wires 17.

In the case of the embodiment according to FIG. 4, the coils 12 of the stator segments 14 of the groups of stator segments 14, which are connected to the same subunit 4a, 4b of the converter unit 4 in each case, lie tangentially opposite one another. Not only during normal operation, in which all subunits 4a, 4b are working, but also in the event of a failure of one of the subunits 4a, 4b, when only the other subunits of subunits 4a, 4b are therefore working, is the rotary machine 3 thus operated symmetrically. This causes an equalization of the forces which act on the rotor 8 in the radial direction. In the embodiment according to FIG. 3, in the event of a failure of one of the subunits 4a, 4b, however, a resultant force acts on the rotor 8 in the radial direction. The direction of this force—upward, downward, to the left, to the right—depends upon which group of stator segments 14 is no longer being supplied with current due to the failure of one of the subunits 4a, 4b.

Figure 6:
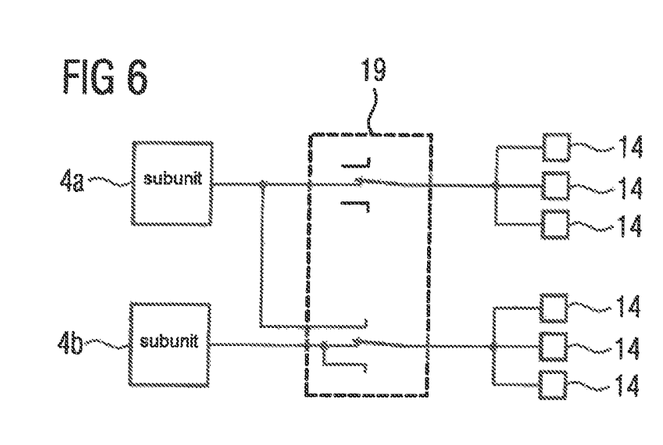
FIG. 6 shows a converter unit, a switching device and a stator in a first switching state of the switching device.

Preferably, in the event of a failure of one of the subunits 4a, 4b, the subunits 4a, 4b are therefore connected to the groups of stator segments 14 in such a way that the direction of said force, as far as possible, is directed counter to the weight force which the rotor 8 exerts on its bearing. For this purpose, according to the representation in FIG. 6, the converter unit 4 may have a switching device 19. The switching device 19 is arranged between the subunits 4a, 4b and the coils 12 of the rotary machine 3, in particular—provided that the partial ring wires 17 are present—between the subunits 4a, 4b and the partial ring wires 17. The switching device 19 may be embodied as a contactor or another electromechanically operating switching device. By way of the switching device 19, it is possible to adjust which of the subunits 4a, 4b of the converter unit is connected to the coils 12 of which groups of stator segments 14. During normal operation of the combination 2, if therefore all subunits 4a, 4b of the converter unit 4 are working correctly, then according to the representation in FIG. 6 each subunit 4a, 4b is connected to each group of stator segments 14.

Subsequently, it is assumed that the coils 12 of the stator segments 14, which are connected to the subunit 4a during normal operation, exert a force on the rotor 8 which has the same direction as the weight force of the rotor 8. In this case, the coils 12 of the stator segments 14, which are connected to the subunit 4b during normal operation, exert a force on the rotor 8 which is directed counter to the weight force of the rotor 8. In the event of a failure of one of the subunits 4a, 4b, the coils 12 of the stator segments 14, which are connected to the subunit 4a during normal operation, should therefore be disconnected from the converter unit 4 and the coils 12 of the stator segments 14, which are connected to the subunit 4b during normal operation, should remain connected to the converter unit 4.

Figure 7:
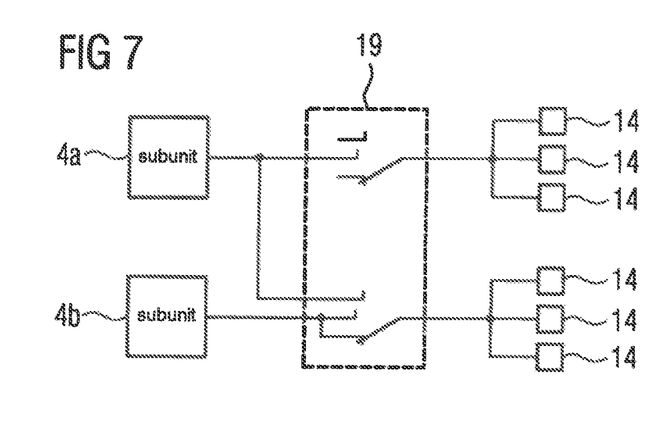
FIG. 7 shows the embodiment of FIG. 7 in a second switching state of the switching device.
Figure 8:
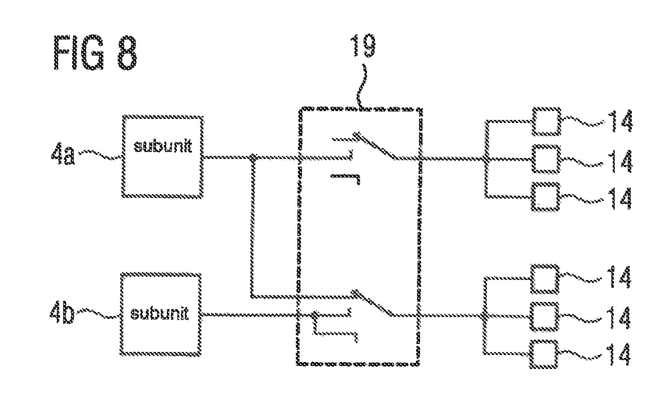
FIG. 8 shows the embodiment of FIG. 7 in a third switching state of the switching device.

Therefore, if the subunit 4a fails, then according to the representation in FIG. 7 the coils 12 of the stator segments 14, which are connected to the subunit 4b during normal operation, continue to remain connected to the subunit 4b. The coils 12 of the stator segments 14, which are connected to subunit 4a during normal operation can, as required, be disconnected from the defective subunit 4a or remain connected to the defective subunit 4a. If the subunit 4b fails, however, then according to the representation in FIG. 8 the coils 12 of the stator segments 14, which are connected to the subunit 4a during normal operation, are disconnected from the subunit 4a—which continues to be operational as before. According to the representation in FIG. 8, the coils 12 of the stator segments 14, which are connected to the subunit 4b during normal operation, however, are disconnected from the subunit 4b and connected to the subunit 4a.

The approach explained above may be expanded to more than two subunits 4a, 4b as required. Although the switching complexity increases, the principle remains the same.

By way of the approach explained, it is achieved that, in the event of a failure of one of the subunits 4a, 4b, the force which acts on the rotor 8 and is induced by the asymmetrical interaction of the stator 11 with the rotor 8, as far as possible, is constantly directed counter to the weight force of the rotor 8.

Depending on the design of the dynamoelectric machine (rotary machine) 3 as an internal rotor or as an external rotor, the subunits 4a, 4b are arranged about the stator 11 and/or in an axial extension of the stator 11 and/or in the stator 11. This positioning depends upon the local conditions and the design of the dynamoelectric machine (rotary machine) 3, in particular of the generator.

The present invention has been explained above in conjunction with a combination 2 of a rotary machine 3 and a converter unit 4, wherein the combination 2 is used in a wind power installation. The combination 2 may also be applied in other embodiments, however, for example in an electrical drive or a different kind of generator.

The present invention has many advantages. The embodiments according to the invention are favorable from both a technical and economical perspective. Furthermore, compared to rotary machines 3 of the prior art, in which at least six completely circumferential ring wires are required, the ring wires are replaced by the partial ring wires 17, so that the additional axial structural length of the rotary machine 3 required for the ring wires can be halved. The manufacturing outlay can also be reduced. Numerous connections no longer have to be soldered, but rather can be converted into screw connections—for example via cable lugs. The switching complexity for connecting the terminals 15 to the subunits 4a, 4b can be reduced. Eddy current losses in the magnets or in the rotor yoke, which occur in the event of a failure of one of the subunits 4a, 4b in the rotor 8 of the rotary machine 3, can be kept low. The operational characteristics in the event of a failure of one of the subunits 4a, 4b are optimized.

Although the invention has been illustrated and described in greater detail with the preferred exemplary embodiment, the invention is not restricted by the examples disclosed and other variations can be derived therefrom by the person skilled in the art without departing from the protective scope of the invention.

What is claimed is:

1. Apparatus, comprising:
   an electric rotary machine including a rotor mounted for rotation about an axis of rotation, a stator mechanically divided into a number of stator segments, with each of the stator segments covering a sector in relation to the axis of rotation, and coils of an individual multi-phase rotary system arranged in the stator segments, respectively, with the stator segments having each terminals for connecting phase wires of the individual multi-phase rotary system, said terminals being connected to the coils of the phases, said stator segments forming groups of immediately successive stator segments, when viewed about the axis of rotation, with the groups of stator segments being each made of a plurality of stator segments, said groups of stator segments extending each over 360°/n, wherein n is equal to a number of subunits connected to the coils of the rotary machine; and
   a converter unit including a plurality of subunits which are independently operable of one another and form each of the individual multi-phase rotary systems, with a number of phases of the subunits matching a number of phases of the stator segments, said terminals of the stator segments of the rotary machine being connected to the subunits such that the terminals of the stator segments within a respective one of the groups are connected to a same one of the subunits of the converter unit and the terminals of the stator segments of the successive groups of stator segments, when viewed about the axis of rotation, are connected to subunits of the converter unit which differ from one another, said converter unit further including a switching device arranged between the subunits and the coils of the rotary machine and configured to enable adjustment as to which of the subunits of the converter unit is connected to the coils of which group of stator segments,
   wherein in the event of a failure of one of the subunits of the converter unit, a resultant force acts on the rotor in a radial direction, and
   wherein in the event of a failure of one of the subunits of the converter unit, the subunits are connected to the groups of stator segments in such a way that the direction of the resultant force is directed to counter a weight force as exerted by the rotor.

2. The apparatus of claim 1, wherein the terminals of each stator segment are connected to a plurality of groups of immediately successive coils, when viewed about the axis of rotation, which groups are arranged on the stator segment, and wherein arranged between every two groups of immediately successive coils, when viewed about the axis of rotation, of one of the phases is one group of immediately successive coils, when viewed about the axis of rotation, of each of another of the phases.

3. The apparatus of claim 2, wherein the number of coils per coil group amounts to one, or is greater than one.

4. The apparatus of claim 1, wherein the stator includes partial ring wires, which extend over a partial circumference, when viewed about the axis of rotation, and which are each connected to the terminals of the stator segments of an individual group of stator segments.

5. The apparatus of claim 4, wherein the partial ring wires for each phase each have a further terminal for connecting the respective partial ring wire to one of the subunits of the converter unit.

6. The apparatus of claim 1, wherein the rotor is embodied as an external rotor.

7. The apparatus of claim 1, wherein the number of phases amounts to three.

8. A wind power installation, comprising:
   an electric rotary machine including a rotor mounted for rotation about an axis of rotation, a stator mechanically divided into a number of stator segments, with each of the stator segments covering a sector in relation to the axis of rotation, and coils of only an individual multi-phase rotary system arranged in the stator segments, respectively, with the stator segments having each terminals for connecting phase wires of the individual multi-phase rotary system, said terminals being connected to the coils of the phases, said stator segments forming groups of immediately successive stator segments, when viewed about the axis of rotation, with the groups of stator segments being each made of a plurality of stator segments, said groups of stator segments extending each over 360°/n, wherein n is equal to a number of subunits connected to the coils of the rotary machine;

a converter unit including a plurality of subunits which are independently operable of one another and form each of the individual multi-phase rotary systems, with a number of phases of the subunits matching a number of phases of the stator segments, said terminals of the stator segments of the rotary machine being connected to the subunits such that the terminals of the stator segments within a respective one of the groups are connected to a same one of the subunits of the converter unit and the terminals of the stator segments of the successive groups of stator segments, when viewed about the axis of rotation, are connected to subunits of the converter unit which differ from one another, said converter unit further including a switching device arranged between the subunits and the coils of the rotary machine and configured to enable adjustment as to which of the subunits of the converter unit is connected to the coils of which group of stator segments, wherein in the event of a failure of one of the subunits of the converter unit, a resultant force acts on the rotor in a radial direction, and wherein in the event of a failure of one of the subunits of the converter unit, the subunits are connected to the groups of stator segments in such a way that the direction of the resultant force is directed to counter a weight force as exerted by the rotor; and a wind turbine configured to drive the rotor of the electric rotary machine.

9. The wind power installation of claim 8, wherein the terminals of each stator segment are connected to a plurality of groups of immediately successive coils, when viewed about the axis of rotation, which groups are arranged on the stator segment, and wherein arranged between every two groups of immediately successive coils, when viewed about the axis of rotation, of one of the phases is one group of immediately successive coils, when viewed about the axis of rotation, of each of another of the phases.

10. The wind power installation of claim 9, wherein the number of coils per coil group amounts to one, or is greater than one.

11. The wind power installation of claim 8, wherein the stator includes partial ring wires, which extend over a partial circumference, when viewed about the axis of rotation, and which are each connected to the terminals of the stator segments of an individual group of stator segments.

12. The wind power installation of claim 11, wherein the partial ring wires for each phase each have a further terminal for connecting the respective partial ring wire to one of the subunits of the converter unit.

13. The wind power installation of claim 8, wherein the rotor is embodied as an external rotor.

14. The wind power installation of claim 8, wherein the number of phases amounts to three.

* * * * *